United States Patent Office 2,900,879
Patented Aug. 25, 1959

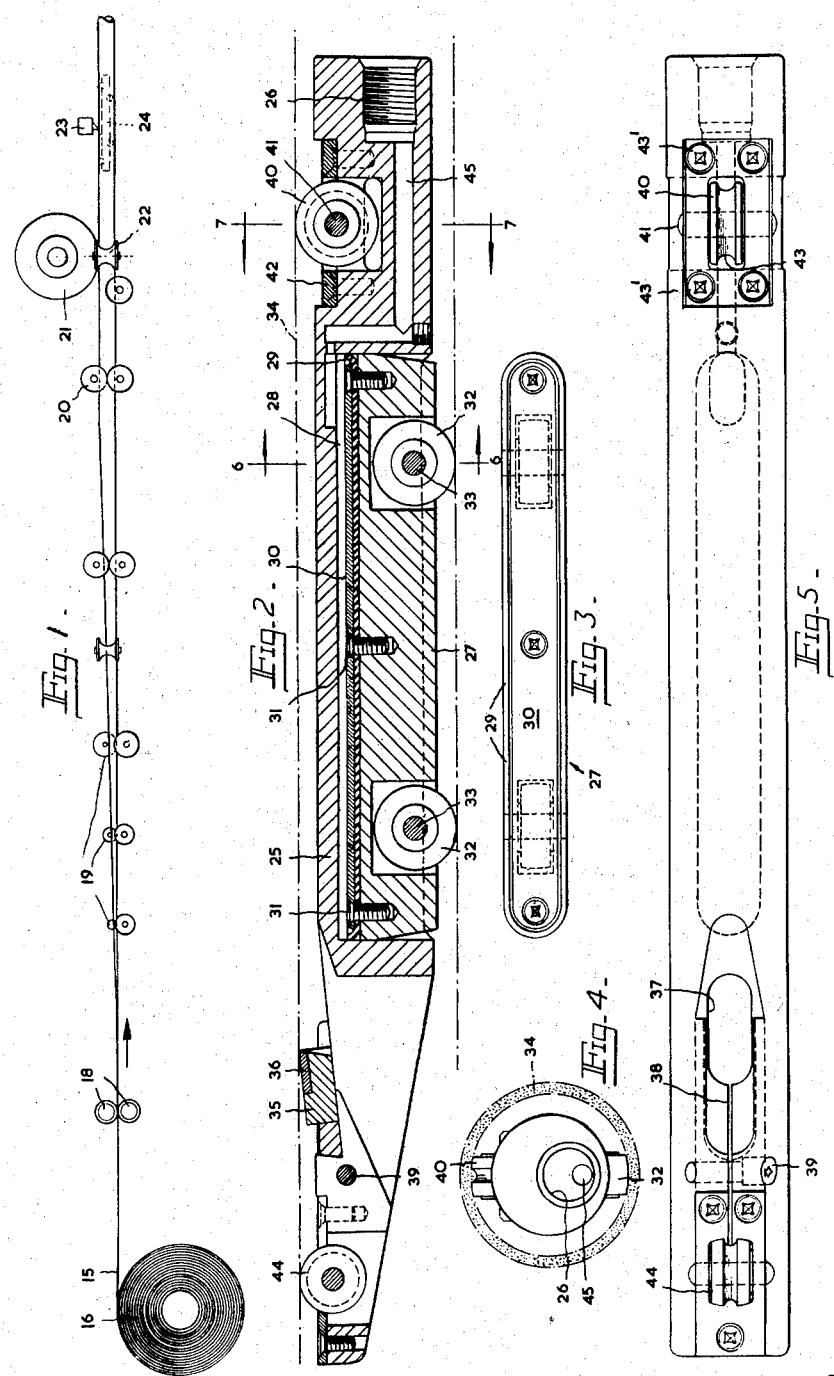

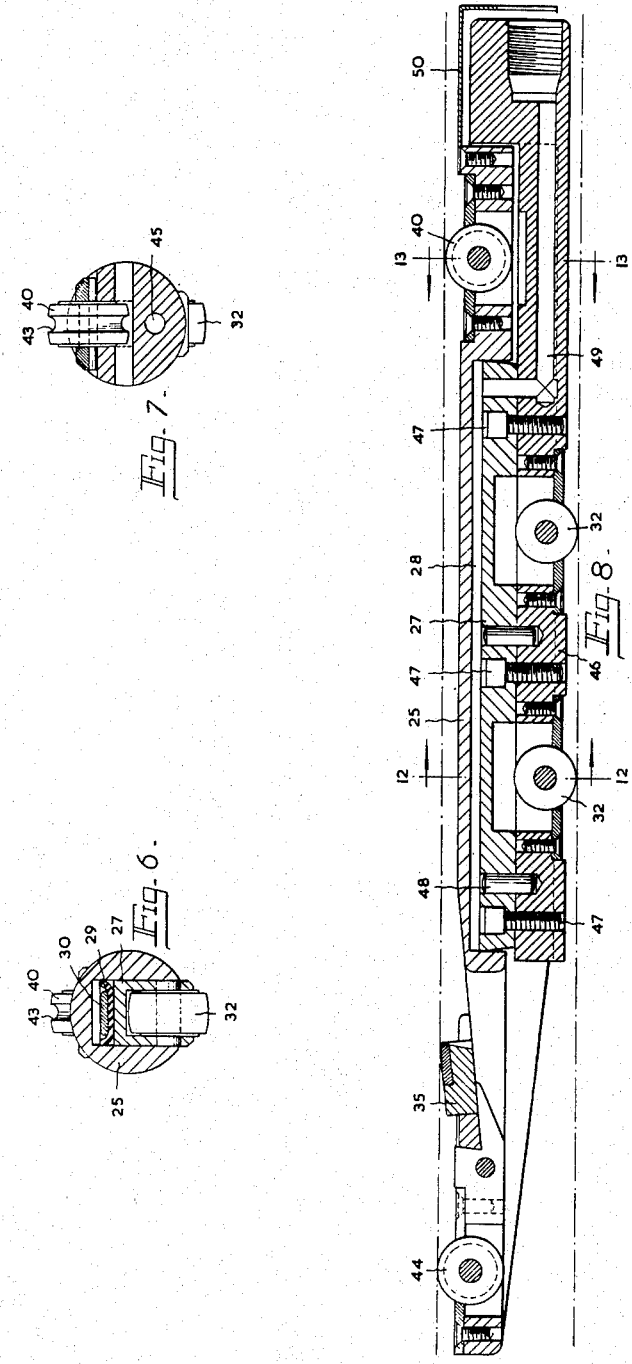

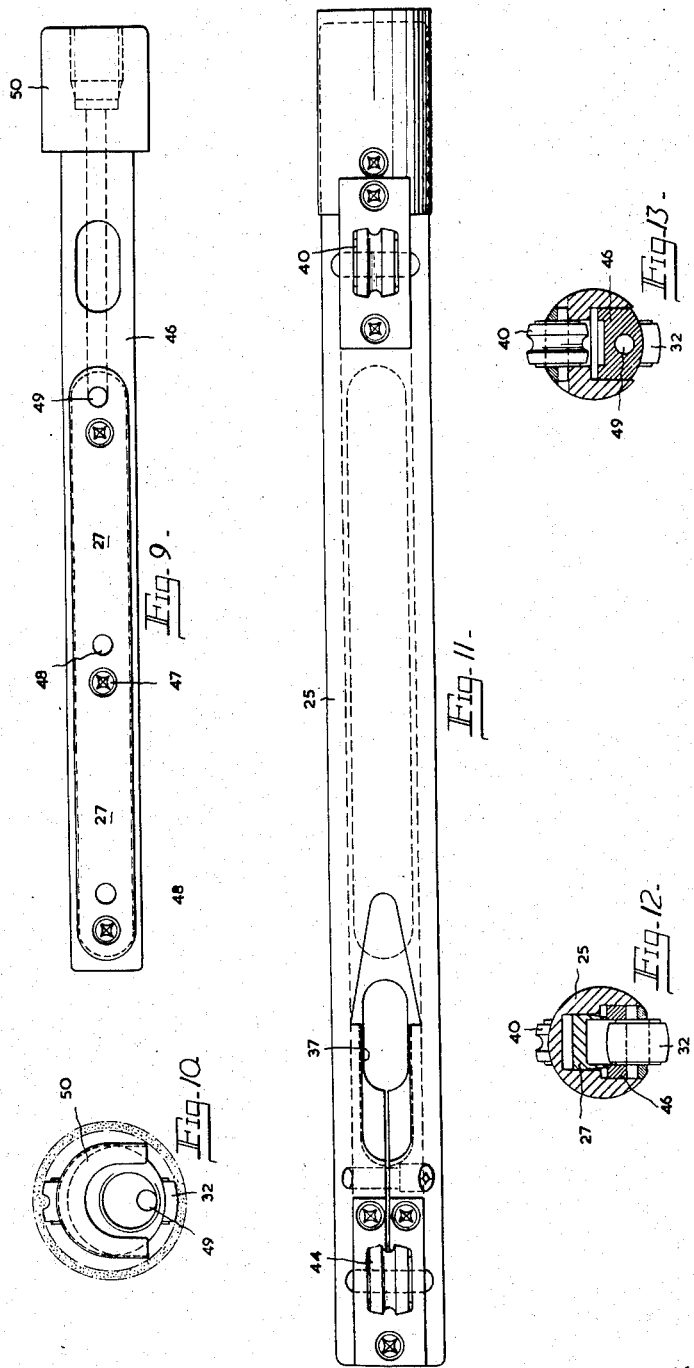

2,900,879
MANUFACTURE OF SEAM-WELDED TUBING

Albert Norton and Harry O. Bradshaw, Warwickshire, England, assignors to Tube Products Limited, Oldbury, Worcestershire, England, a British company Application August 10, 1955, Serial No. 527,606

Claims priority, application Great Britain March 18, 1955

1 Claim. (Cl. 90—24)

This invention relates to the manufacture of seam-welded tubing made by folding flat strip longitudinally into tubular cross-sectional form and joining the abutting edges in a welded seam. The joint may be effected for example by electrical resistance or induction welding, or by fusion welding by arc or flame.

In the manufacture of such tubing flat metal strip is passed through a succession of rolls which first turn up the longitudinal edges to give the strip a wide U-shaped cross-sectional form and then gradually bring these edges together to complete the full circular shape. The abutting edges are continuously welded under pressure. The pressure is essential to satisfactory welding but causes a fin or flash inside and outside the tube. This is removed by stationary cutting tools past which the tube travels.

The inside cutting tool is supported on a bar which is mounted on a rigid bracket entering the open side of the initial U-shaped section of the tube. The bar extends into the bore of the tube beyond the rolls which close the edges together and beyond the welding station. In conventional practice it is a matter of considerable difficulty to control the inside cutting tool so that it removes the flash completely but does not damage the bore of the tube. If the cutting tool strikes an obstacle which it cannot remove, delay often occurs before the tool can be disengaged.

It is an object of the present invention to provide a cutting head for removing internal fin or flash from a welded joint in the manufacture of seam-welded tubing comprising a carrier, a cutting tool mounted on the carrier for engaging and cutting the said internal fin or flash from a tube and a reaction member for engaging the tube bore opposite the cutting tool and fluid pressure operated means for urging apart the carrier and the reaction member.

It is a further object of the present invention to provide a cutting head and a fixed bar locating the cutting head within the bore of the welded tubing the cutting head comprising a carrier, a cutting tool mounted on the carrier for engaging and cutting the said internal fin or flash from the tubing and a reaction member for engaging the bore opposite the cutting tool and fluid pressure operated means for urging apart the carrier and the reaction member.

Means for varying the fluid-pressure is preferably provided to adjust the force with which the cutting tool is urged towards the work and so to correct its depth of cut. The arrangement is preferably such that the fluid-pressure operated means can deflect to accommodate variations in bore size without significant changes in the fluid-pressure and the force with which the cutting tool is urged towards the work.

If some obstruction to the passage of the tube past the cutting tool occurs the fluid-pressure can be relaxed to allow the cutting tool to clear the obstacle.

Either the tool carrier or the reaction member may be rigidly connected to the fixed locating bar, and the other be mounted for radial movement with respect thereto.

Embodiments of the invention will now be described by way of example and with reference to the accompanying drawings in which:

Figure 1 illustrates the manufacture of seam-welded tubing.

Figure 2 is a longitudinal section of one cutting head embodying the invention.

Figure 3 is a plan view of one of the components of the head shown in Figure 2.

Figure 4 is an end elevation of the cutting head.

Figure 5 is a plan view of another component of the head.

Figures 6 and 7 are sectional views on lines 6—6 and 7—7 respectively of Figure 2.

Figures 8 to 13 show another embodiment and correspond to Figures 2 to 7 respectively, Figures 12 and 13 being sectional views on lines 12—12 and 13—13 of Figure 8.

Referring first to Figure 1 strip metal 15 is drawn from a coil 16 and the edges are trimmed by rotary edge shears 18 to ensure correct width. The form rolls 19 turn up the longitudinal edges to give the strip a wide U-shaped cross-sectional form and then gradually bring these edges together until at the last roll 20 it has a full circular cross-section and is ready to be welded. In Figure 1 resistance welding is illustrated. The abutting edges are passed under spaced coaxial rotatable electrode discs 21 electrically insulated from one another and connected to a low voltage source of electricity. The electrode discs 21 engage the tube one on each side of the joint. Owing to the resistance of the joint, an electric current flowing across it from one electrode to the other causes local heating of the metal to welding temperature. On opposite sides of the tube are pressure rolls 22 which guide and support it and force its edges together while they are welded. The external fin or flash at the seam is removed by a stationary cutting tool 23 and the internal fin or flash by a tool supported by a cutting head 24 in accordance with the invention which is located in position in the tube by a bar (not shown) mounted on a rigid bracket which enters the open side of the initial U-shaped section of the tube before the joint is closed at the form roller 20.

The cutting head shown in Figures 2 to 7 has a tool carrier 25 and a reaction member 27. In this embodiment the tool carrier is the part of the cutting head rigidly located by the bar. The locating bar is received in a screwed socket 26. The reaction member 27 which forms a piston for the fluid-pressure operated means has the general shape of a sunk key, that is to say it has parallel sides and rounded ends and its length greatly exceeds its width and thickness (Figure 3).

The reaction member is received in a seating 28 of complementary shape which forms the "cylinder" of the fluid-pressure operated means. The reaction member is slidable in the seating in a direction radial with respect to the tube represented at 34 in which the cutting head is to be used. A peripheral leather washer 29 secured to the reaction member 27 by a washer plate 30 and screws 31 forms a fluid seal between "piston" and "cylinder." Near each end of the reaction member 27 rollers 32 rotatably mounted on spindles 33 are provided to engage the bore of the tube. The rollers 32 are crowned to suit the curvature of the bore of the tube on which the head is to be used.

The seating 28 is arranged longitudinally in the tool carrier in an intermediate position between the ends of the carrier.

A cutting tool 35 having a hard tip 36 of suitable material such as tungsten-carbide is received in a recess 37 towards the free end of the tool carrier which is split by an axial slot 38. The two parts of the split portion can be drawn together by a transverse bolt 39 in order to grip the sides of the tool.

Towards the supported end of the tool carrier at the same distance from the seating 28 as the cutting tool a roller 40 is provided. It is rotatably mounted on a spindle 41 the ends of which are received in recesses in the carrier and are held in place by a plate 42 secured by bolts 43'. The roller 40 is domed like the rollers 32 but in addition has a circumferential groove 43 to straddle the flash or "fin" to be removed.

As shown in the drawings a similar roller 44 may be provided at the free end of the carrier beyond the cutting tool to limit its maximum depth of cut. The roller 44 may also be circumferentially grooved to straddle the seam from which the flash or fin has been removed so that its limiting effect is independent of the depth of cut.

All the rollers 32, 40 and 44 may be mounted in a similar manner to the roller 40 as described above. The rollers are then readily removable to be replaced by others of a size suitable for work on a different diameter tube.

By means of passages through the locating bar, the screwed socket 26, and passages 45 drilled through the tool carrier and opening into the seating 28, fluid-pressure is applied to the reaction member 27 from a suitable external source such as the compressed air supply of the mill or works in which the plant is installed and connected through a reducing valve or a suitable pressure controlling valve or both.

In use during the manufacture of seam-welded tubing, as described in connection with Figure 1 fluid-pressure supplied to the seating 28 urges the tool carrier and reaction member apart and forces the cutting tool 35 against the fin or flash which is removed as the tube 34 passes over the cutting tool. The amount of fluid-pressure determines the force with which the cutting tool is urged towards the work and therefore the depth of cut subject to the over-riding control of the roller 44 if one is fitted. The pressure-regulating means is preferably of such a nature that a substantially constant pressure can be maintained despite deflection of the reaction member.

When the cutting tool has to be disengaged from the work, to remove the cutting head from the tube or to clear an obstruction, fluid-pressure is relaxed and the cutting head can then easily be withdrawn.

In the modification illustrated in Figures 8 to 13 many of the constructional details are the same as in the embodiment of Figures 2 to 7. Similar parts bear similar reference numerals. The principal change is that the reaction member 27 is rigidly secured to the locating bar by an attachment member 46 and the tool carrier 25 is free to move radially of the tube 34 with respect to the locating bar.

Since in this embodiment the thrust of the cutting tool 35 has to be transmitted to the locating bar through the reaction member 27 and the attachment member 46, the reaction member 27 is made of Phosphor bronze or other suitable bearing material and fits the seating 28 closely so that a leather cup washer is unnecessary though one may be provided if desired. The reaction member is rigidly secured to the attachment member 46 by bolts 47 and dowel pins 48. Passages 49 drilled through the reaction member 27 and the attachment member 46 are provided for the application of fluid-pressure to the interior of the seating 28. Th rollers 32 are mounted on the attachment member 46. A cover 50 is provided to prevent the entry of tool chips into the gap between the tool carrier and the attachment member.

In operation this modified embodiment is similar to the embodiment of Figures 2 to 7.

In a further modification the piston and cylinder arrangement may be replaced by an inflatable bag or bladder located between the carrier and the reaction member for producing the necessary radial pressure.

We claim:

A cutting head for trimming internal flash from a welded joint in the manufacture of seam-welded tubing comprising a carrier, a cutting tool rigidly mounted on the carrier for engaging and cutting such internal flash, an elongated reaction member for engaging the side of the bore opposite the cutting tool and radially slidable in fluid pressure retaining relation in a complementarily-shaped recess in the carrier and means for connecting the interior of said recess with a source of fluid-pressure, the elongated member having, to engage the walls of the recess, spaced sides parallel to one another and to the axis of the tube, the length of the sides greatly exceeding the width and thickness of the reaction member.

References Cited in the file of this patent

UNITED STATES PATENTS

| | | |
|---|---|---|
| 2,243,197 | De Fiore | May 27, 1941 |
| 2,573,295 | Allardt | Oct. 30, 1951 |
| 2,714,338 | Nance | Aug. 2, 1955 |